United States Patent [19]

Hsu

[11] Patent Number: 5,064,129

[45] Date of Patent: Nov. 12, 1991

[54] APPARATUS FOR WINDING TWO-FACE ADHESIVE TAPE ON A CLUB SHAFT OF A GOLF CLUB

[76] Inventor: Kuo H. Hsu, 1 Fl., No. 1-2, Lane 30, Sec.2, Hsin Sheng S. Rd.,, Taipei, Taiwan

[21] Appl. No.: 531,880

[22] Filed: May 31, 1990

[51] Int. Cl.$^5$ .............................................. B32B 1/00
[52] U.S. Cl. .................................. 242/7.01; 156/425; 242/7.23
[58] Field of Search ................. 242/7.01, 7.02, 7.21, 242/7.22, 7.23; 156/425, 429, 446

[56] References Cited

U.S. PATENT DOCUMENTS

| 428,873 | 5/1890 | Adams | 242/7.01 |
| 1,215,934 | 2/1917 | Heckman | 242/7.23 |
| 1,807,869 | 6/1931 | Okey | 156/425 X |
| 2,475,305 | 7/1949 | Baker | 242/7.01 |
| 3,300,356 | 1/1967 | Warnken et al. | 156/425 X |
| 3,530,901 | 9/1970 | Richardson | 242/7.23 X |

Primary Examiner—Katherine Matecki
Attorney, Agent, or Firm—Poms, Smith, Lande & Rose

[57] ABSTRACT

An apparatus for winding two-face adhesive tape to an end of a club shaft of a golf club for installation of a grip of the golf club includes a base on which a vertical wall is mounted. A two-faced adhesive tape supplying device is provided on an upper portion of the vertical wall and is downwardly movable along a vertical screw bar driven by a driving means. A holding assemby is provided on the vertical wall for holding the club shaft in a vertical orientation during the winding of the adhesive tape while the club shaft is rotatable about it longitudinal axis.

4 Claims, 7 Drawing Sheets

5,064,129

APPARATUS FOR WINDING TWO-FACE ADHESIVE TAPE ON A CLUB SHAFT OF A GOLF CLUB

BACKGROUND OF THE INVENTION

The present invention relates to an apparatus for winding two-face adhesive tape on a club shaft, particularly to an apparatus for winding two-face adhesive tape to an end of a club shaft for subsequent installation of a grip during assembly of the club.

Conventionally, the winding of a two-face adhesive tape to a club shaft for subsequent installation of a grip during the assembly of the club is done manually, which takes a long time and is inefficient. Some factories utilize rotating plates to assist in the winding of the adhesive tape, which is still inconvenient. In addition, the quality of the golf club is questionable in that the inclined angle of the helical portion of the adhesive tape to the club shaft is not easily controlled.

The present invention provides an automatic apparatus for winding two-face adhesive tapes on a club shaft to eliminate the above-mentioned problems.

SUMMARY OF THE INVENTION

It is an object of the present invention to provide an apparatus for winding two-face adhesive tape on a club shaft for subsequent installation of a grip during the assembly of the golf club.

It is another object of the present invention to provide a step motor and a screw bar in cooperation with transmission means and electromagnetic clutch to proceed with the circular winding of two-face adhesive tape to an end of the club shaft.

It is still another object of the present invention to provide a holding assembly to hold the club shaft during the winding of the two-face adhesive tape on the club shaft.

These and additional objects, if not set forth specifically herein, will be readily apparent to those skilled in the art from the detailed description provided hereinbelow, with appropriate reference to the accompanying drawings.

DETAILED DESCRIPTION OF THE PREFERRED EMBODIMENTS

Figure 1:
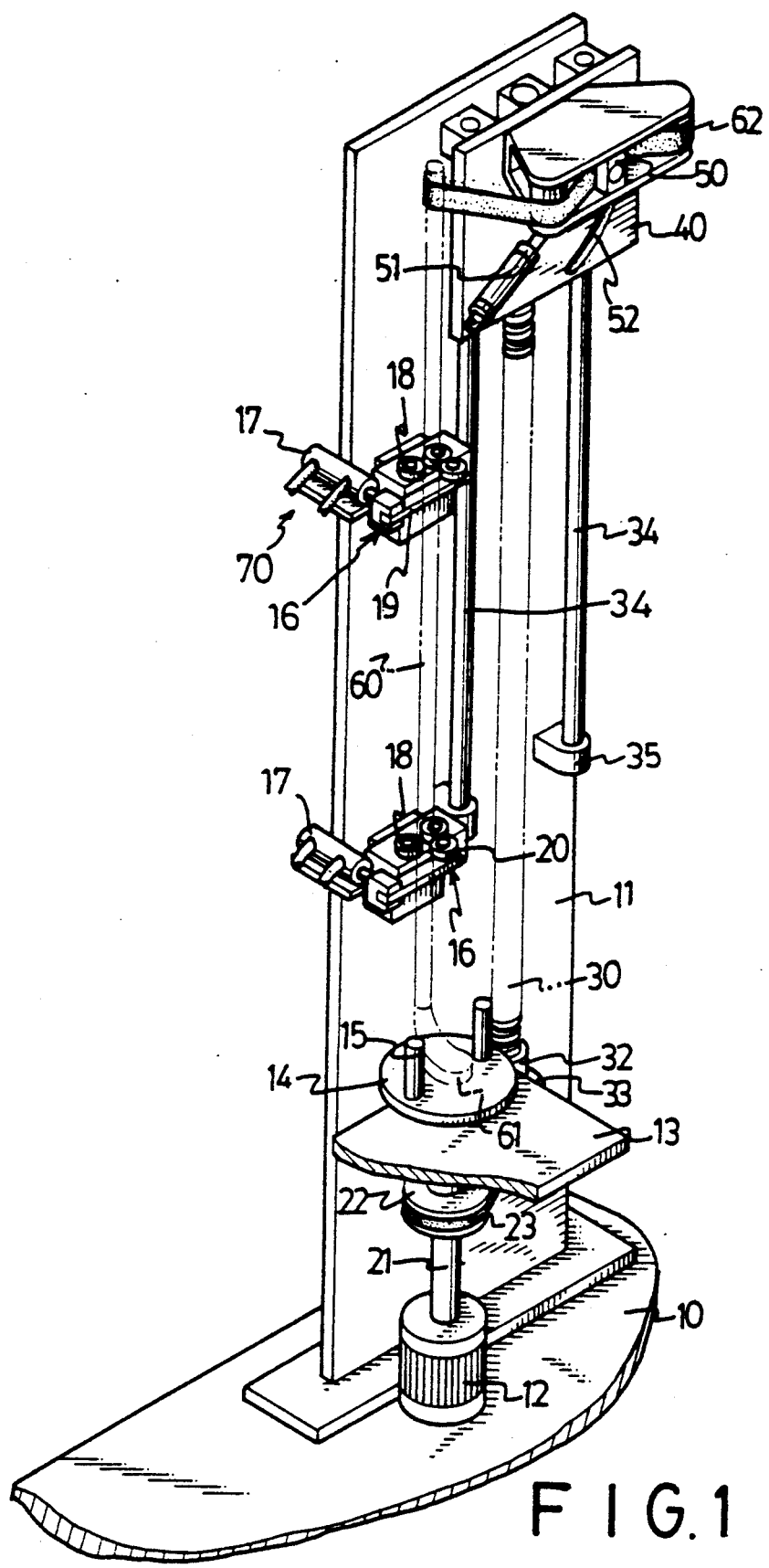
FIG. 1 is a perspective view of an apparatus for winding two-face adhesive tape to a club shaft in accordance with the present invention.
Figure 4:
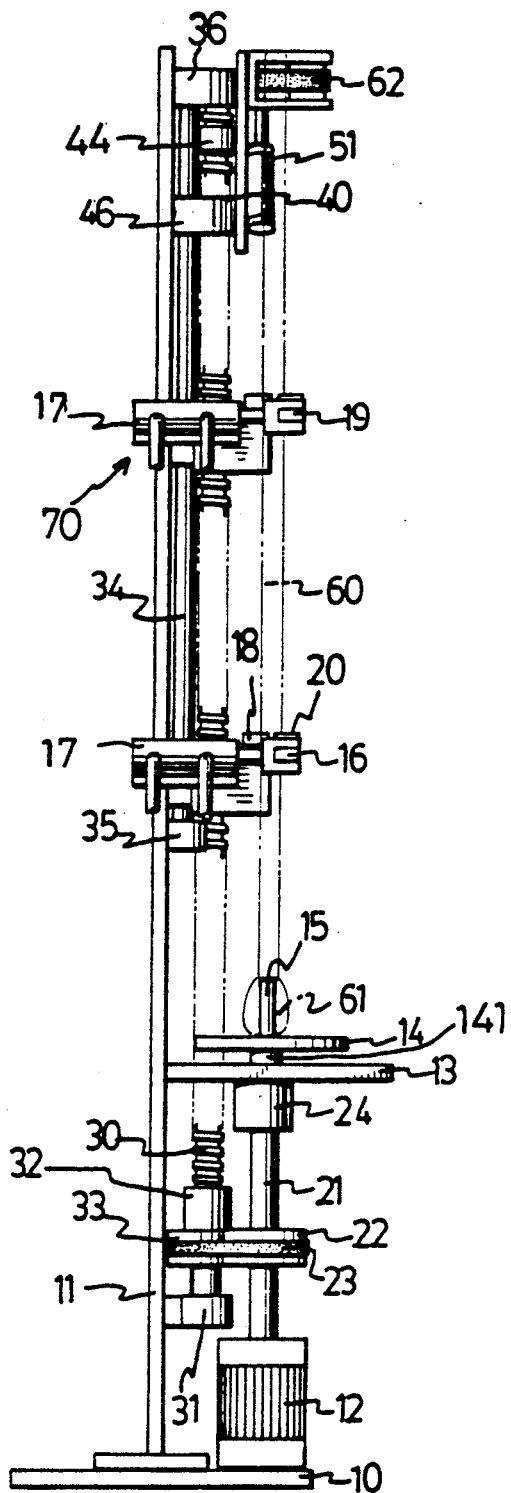
FIG. 4 is a left-side elevational view of the apparatus of FIG. 1, according to the present invention.
Figure 5:
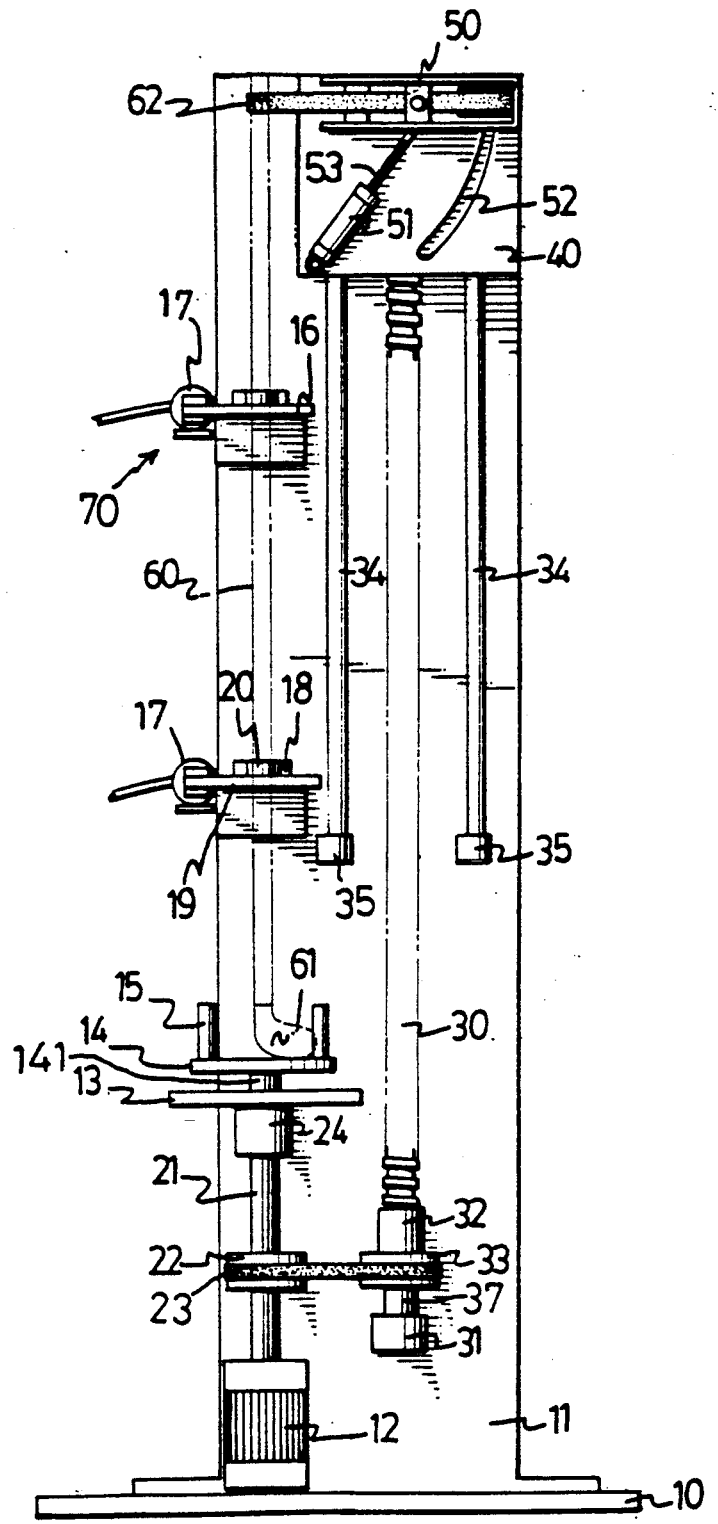
FIG. 5 is a front view of the apparatus of FIG. 1, according to the present invention showing the circular winding of the two-face adhesive tape on an upper end of the club shaft.

Please refer to FIGS. 1, 4 and 5 in which an apparatus for winding two-face adhesive tape 62 to a club shaft 60 of a golf club for subsequent installation of a grip (not shown) to the golf club according to the present invention is shown. The apparatus comprises a base 10 on which a vertical wall 11 is mounted. Two vertical guiding bars 34 are fixedly mounted on a first side of the vertical wall at two ends 35, 36 thereof. A screw bar 30 is rotatably mounted on the vertical wall 11 at an upper end thereof and parallel to and between the two vertical guiding bars 34. As shown in FIG. 5, a first shaft 37 below a lower end of the screw bar 30 is rotatably mounted on the vertical wall at 31 and in alignment with the screw bar 30. A first pulley 33 is mounted on the first shaft 37. The free lower end of the screw bar 30 is provided with a first electromagnetic clutch 32 such that the screw bar 30 is engageable with the first pulley 33 by means of the first electromagnetic clutch 32.

Figure 3:
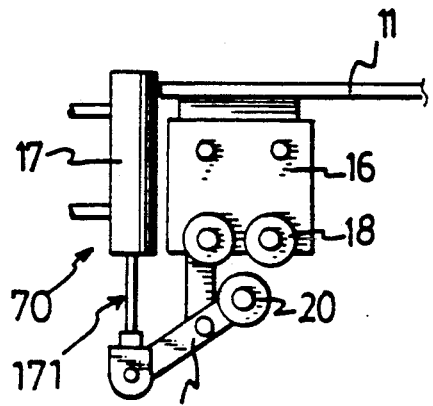
FIG. 3 is a view, similar to FIG. 2, in which the holding assembly is in a closed state.
Figure 2:
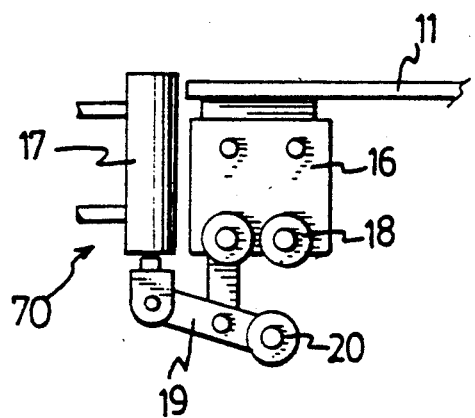
FIG. 2 is a top view of a holding assembly in an open state.

A holding assembly 70 is provided on the vertical wall 11 for holding the club shaft 60 in a vertical orientation during the winding of the adhesive tape 62 while the club shaft 60 is rotatable about its longitudinal axis. In the illustrated embodiment, as shown in FIGS. 1 to 3, the holding assembly 70 comprises two spaced fixed seats 16 mounted on the vertical wall 11. Two fixed rollers 18 are provided on each fixed seat 16. A horizontal holding cylinder 17 with a piston 171 is provided adjacent each fixed seat 16. A rocker arm 19 is attached to a distal end of each piston 171 at a first end thereof and a second end of the rocker arm 19 is provided with a holding roller 20.

The club shaft 60 is held between the two fixed rollers 18 and the holding roller 20 at a first position shown in FIG. 3 by the two holding cylinders 17 during the winding of the adhesive tape 62. The club shaft 60 is released at a second position shown in FIG. 2 through operation of the two holding cylinders 17 after the winding of the adhesive tape 62.

Figure 8:
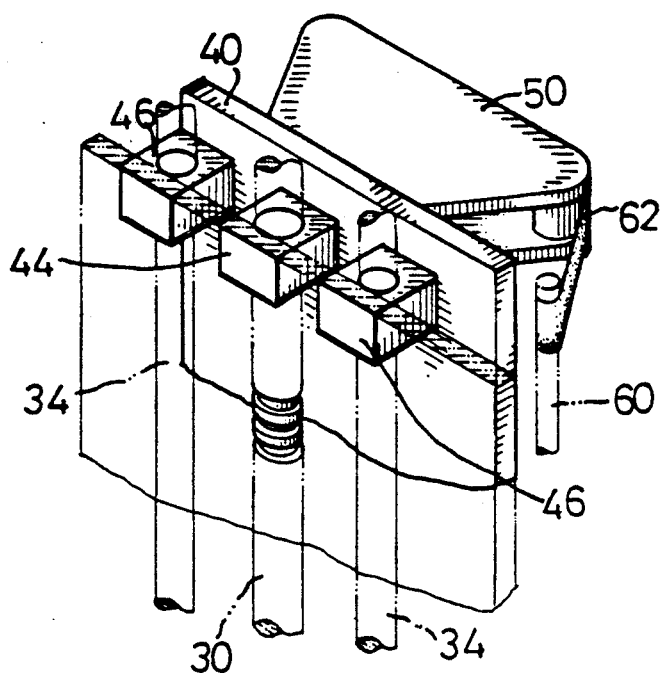
FIG. 8 is a rear perspective view illustrating a vertical plate for mounting a supplying means of two-face adhesive tape.

As shown in FIG. 8, a vertical plate 40 has two hollow sliding means 46 and a hollow inner-threaded means 44 mounted on a rear surface thereof. The two hollow sliding means 46 and the hollow inner-threaded means 44 are sized and dimensioned to be respectively passed therethrough by the two vertical guiding bars 34 and the screw bar 30 such that the vertical plate 40 is vertically movable upon a rotation of the screw bar 30 and guided by the two vertical guiding bars 34 to prevent from any swiveling during the helical winding of the two-face adhesive tape 62 on the club shaft. In FIG. 4, the hollow inner-threaded means 44 is shown to particularly show the engagement with the screw bar 30.

A supplying means 50 for supplying the two-face adhesive tape 62 is provided on an upper portion of the vertical plate 40 adjacent an upper end of the club shaft 60. An arcuate slot 52 is provided on a lower portion of the vertical plate 40. A cylinder 51 with a piston 53 (see FIG. 5) attached to the supplying means 50 is provided on the lower portion of the front surface of the vertical plate 40 such that an end of the supplying means 50 which is distal to an upper end of the club shaft 60 is movable along the arcuate slot 52 by means of the cylinder 51.

A mounting plate 13 is mounted to a lower portion of the first side of the vertical wall 11 and extends horizontally. A horizontal rotating disc 14 is provided above the mounting plate 13 for supporting and rotating a lower end 61 of the club shaft 60 on an upper surface of the rotating disc 14. A main shaft 141 is mounted to an underside of the rotating disc 14 at a first end thereof and penetrates through the mounting plate 13.

A driving means, such as a step motor 12 with a vertical output shaft 21 is mounted on the base 10. A distal end of the output shaft 21 is attached to a second eletromagnetic clutch 24. A second pulley 22 is provided on the output shaft 21 of the step motor 12 and connected to the first pulley 33 be means of a power transmission belt 23. The output shaft 21 is engageable with the second shaft 141 by means of the second electromagnetic clutch 24.

Two retaining bars 15 are provided on the upper surface of the rotating disc 14 for retaining the club head 61 of the golf club 60 on one of the retaining bars 15 such that the golf club 60 rotates with the rotating disc 60.

In the operation of the present invention, as shown in FIG. 5, the club shaft 60 is put on the rotating disc 14 with the club head 61 against one of the retaining bars 15. In a first stage, the club shaft 60 is first rotatably held by the holding assembly 70 and the two-face adhesive tape 62 is attached to the upper end of the club shaft 60. Then, the output shaft 21 of the step motor 12 engages with the second shaft 141 by means of the second electromagnetic clutch 24 and the step motor 12 rotates to a pre-set extent for circularly winding the two-face adhesive tape 62 on the upper end of the club shaft 60 (see FIG. 7) while the supplying means 50 is at a horizontal position and the screw bar 30 does not rotate because the first electromagnetic clutch 32 is not actuated.

Figure 6:
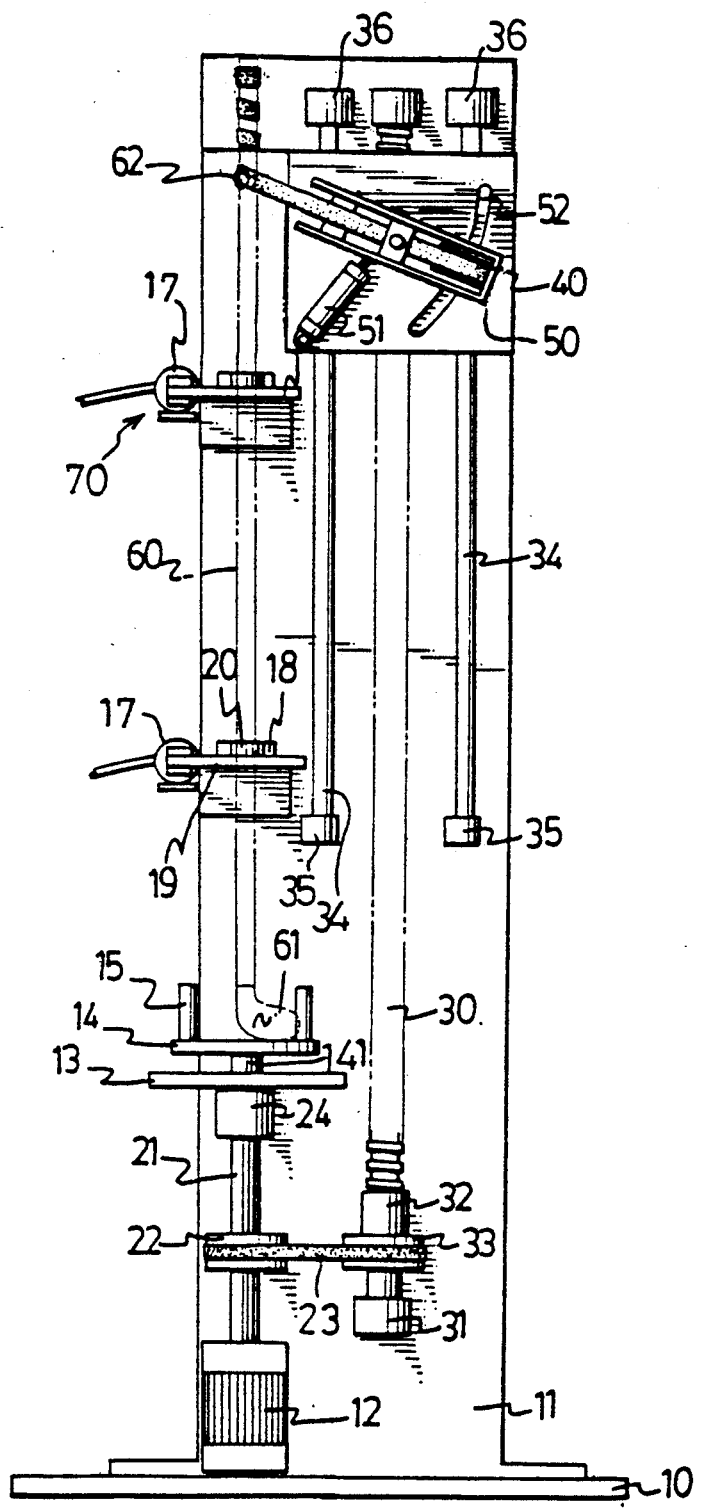
FIG. 6 is a front view of the apparatus showing the helical winding of the two-face adhesive tape on the club shaft from the circularly wound upper end thereof.

The supplying means 50 is inclined at an desired angle by means of the cylinder 51. Then, in a second stage, as shown in FIG. 6, the screw bar 30 engages with the first pulley 33 by means of the first electromagnetic clutch 32 while the output shaft 21 engages with the second shaft 141 such that the step motor 12 rotates to a pre-set extent for helically winding the two-face adhesive tape 62 on the club shaft 60 from the circularly wound first end (see FIG. 7). In the helical winding of the two-face adhesive tape 62, the mounting plate 40 moves downwardly along the screw bar 30 due to the rotation of the screw bar 30 and guided by the two vertical guiding bars 34.

Figure 7:
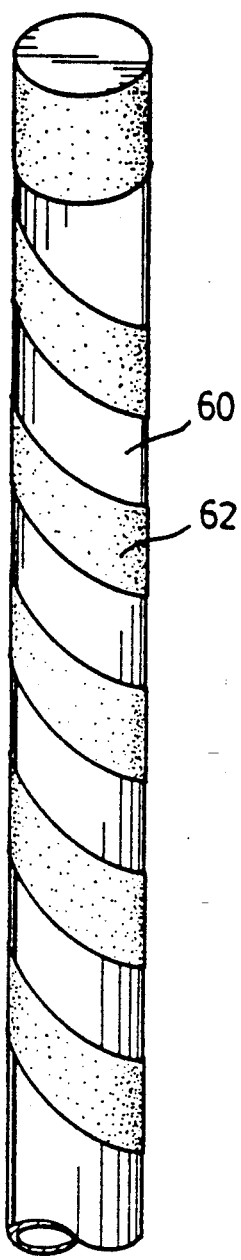
FIG. 7 is a partial perspective view of the club shaft showing the complete winding of the adhesive tape.

As shown in FIG. 7, the upper circular winding of the adhesive tape 62 is completed under the control of the step motor 12 and the second electromagnetic clutch 24, and the helical winding of the adhesive tape 62 is completed under the control of the step motor 12 and the first electromagnetic clutch 32.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. An apparatus for winding two-face adhesive tape to a club shaft of a golf club for installation of a grip of the golf club comprising:

a base;

a vertical wall mounted on said base, two vertical guiding bars fixedly mounted on a first side of said vertical wall at two ends thereof, a screw bar rotatably mounted on said vertical wall at an upper end thereof and parallel to and between said two vertical guiding bars, a first shaft below a lower end of said screw bar, the first shaft being rotatably mounted on said vertical wall and coaxial with said screw bar, a first pulley mounted on said first shaft, said lower end of said screw bar being provided with a first electromagnetic clutch said first electromagnetic clutch selectively coupling said screw bar to said first pulley;

a holding assembly provided on said vertical wall for holding the club shaft in a vertical orientation during the winding of the adhesive tape while the club shaft is rotatable about its longitudinal axis;

a vertical plate having two hollow sliding means and a hollow inner-threaded means mounted on a rear surface of the vertical plate facing said first side of said vertical wall, said two hollow sliding means having through bores through which vertical guide bars pass, and said hollow inner-threaded means having a threaded bore which threadedly engages said screw bars, such that said vertical plate is vertically movable upon a rotation of said screw bar and guided by said two vertical guiding bars to prevent said vertical plate from swiveling;

a supplying means for supplying said two-face adhesive tape mounted on an upper portion of a front side of said vertical plate adjacent an upper end of the club shaft, an arcuate slot on a lower portion of said front side of said vertical plate, a cylinder mounted on said front surface of said vertical plate, the cylinder receiving a piston which is attached to said supplying means, such that an end of said supplying means, which is spaced from the mounting of the supplying means, is movable along said arcuate slot by means of said cylinder:

a mounting plate mounted to a lower portion of said first side of said vertical wall and extending horizontally, a horizontal rotating disc above said mounting plate including means for supporting and rotating a lower end of the club shaft on an upper surface of said rotating disc, a main shaft mounted to an underside of said rotating disc at a first end of the main shaft and penetrating through said mounting plate;

a driving means with a vertical output shaft mounted on said base, a distal end of said output shaft being attached to a second electromagnetic clutch, a second pulley on said output shaft of said driving means and connected to said first pulley by means of a power transmission belt, said output shaft being selectively engageable with said second shaft by means of said second electromagnetic clutch; whereby in a first stage, said output shaft engages with said second shaft by means of said second electromagnetic clutch and said driving means rotates to a pre-set extent for circularly winding said two-face adhesive tape on said upper end of the club shaft while said supplying means is at a horizontal position and said screw bar does not rotate;

in a second stage, said screw bar engages with said first pulley by means of said first electromagnetic clutch while said output shaft engages with said second shaft such that said driving means rotates to a pre-set extent for helically winding said two-face adhesive tape on said club shaft from said first end while said supplying means is inclined at an desired angle by means of said cylinder.

2. The apparatus as set forth in claim 1 wherein said holding assembly comprises two spaced fixed seats mounted on said vertical wall, two fixed rollers on each fixed seat, a horizontal holding cylinder with a piston is adjacent each said fixed seat, a rocker arm attached to a distal end of each said piston, a holding roller mounted on a second end of each said rocker arm, wherein said club shaft is held between said two fixed rollers and said holding roller at a first state through operation of said two horizontal holding cylinders during the winding of said adhesive tape and said club shaft is released at a second state through operation of said two horizontal holding cylinders after the winding of said adhesive tape is completed.

3. The apparatus as set forth in claim 1 further comprising two retaining bars on said upper surface of said rotating plate for retaining said first end of said golf club between said retaining bars.

4. The apparatus as set forth in claim 1 wherein said first end of said golf club is a club head.

* * * * *